INVENTOR
PAUL ARTHUR, JR.
BY Albert B. Griggs
ATTORNEY

United States Patent Office 3,056,747
Patented Oct. 2, 1962

3,056,747
PROCESS FOR THE PRODUCTION OF FIBROUS ALUMINA MONOHYDRATE
Paul Arthur, Jr., Wilmington, Del., assignor to E. I. du Pont de Nemours and Company, Wilmington, Del., a corporation of Delaware
Filed Dec. 13, 1957, Ser. No. 703,476
3 Claims. (Cl. 252—313)

This invention relates to a new form of alumina and to its production.

The present invention effects the preparation of fibrous alumina by heating an aqueous acidic dispersion of alumina in the presence of sulfate ion. The resulting alumina has the characteristic X-ray diffraction pattern of boehmite. The sulfate ion profoundly modifies the character of the alumina fibers produced, making them much longer and thinner than products produced under similar conditions without the sulfate. The preferred fibrous alumina products of the invention have at least one and preferably two dimensions, that is breadth and thickness, in the colloidal range and they are characterized by their high axial ratio and by the presence of sulfate ion.

The invention will be better understood by reference to the drawings in which

Figure 1:
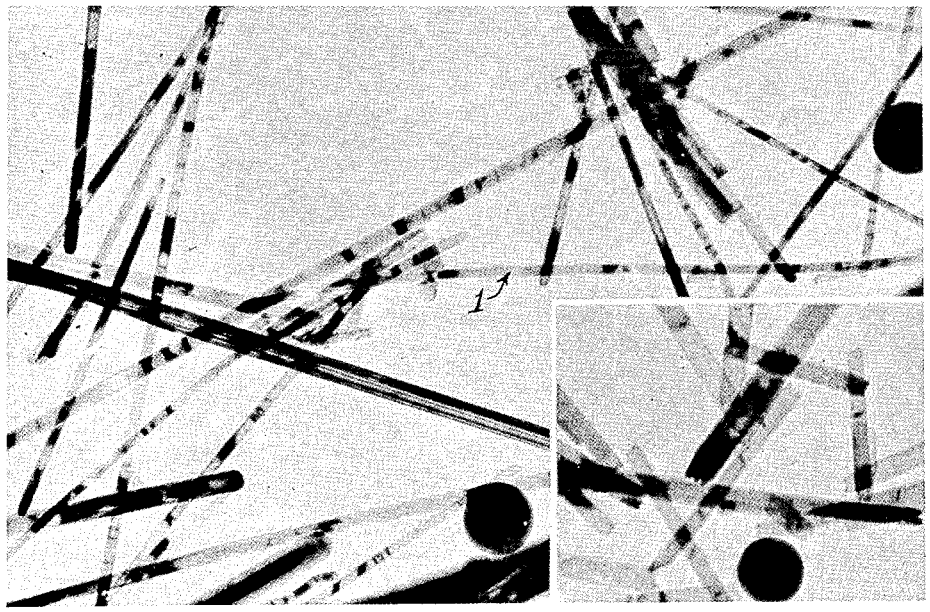

FIGURE 1 is a photolithograph of an electron micrograph at 50,000 diameters of a product of the invention prepared at low temperature. The inset compares a prior product produced under similar conditions but omitting the sulfate. The black circular objects in this and in the following figure are polystyrene latex particles having a diameter of 280 millimicrons.

Figure 2:
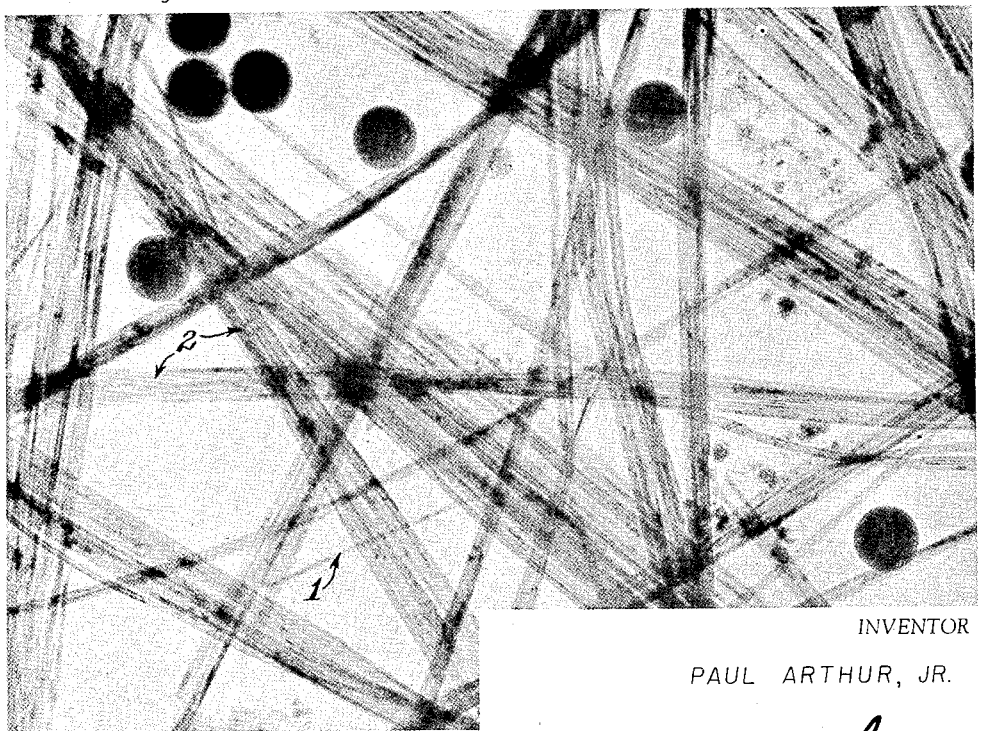

FIGURE 2 is a photolithograph of an electron micrograph at 50,000 diameters of a product of the invention prepared at high temperature and pressure.

In processes for the preparation of fibrous boehmite an aqueous dispersion of alumina is used as a starting material. This dispersion can be formed of a suitable alumina sol or can be prepared initially from an aluminum salt which, under the process conditions, forms a dispersion of alumina.

The starting material used preferably has such a molecular structure, degree of hydration, and particle size that the time, $\theta$, required to depolymerize half of a sample in acid into aluminum ions is less than 500 minutes.

The $\theta$ value for a particular alumina sample is quantitatively expressed as the time in minutes required for the depolymerization of half a sample of the alumina in the presence of excess acid at a temperature of 98° C.

An amount of the alumina sample equivalent to 4.8 grams of $Al_2O_3$ is weighed out. One hundred and eleven milliliters of 5.0 N HCl is heated to 98° C. The mole ratio of acid to alumina is thus 3:1. Distilled water sufficient with the alumina and acid to make a total of 200 grams is measured out. The water is added to the alumina sample and the mixture is heated to 98° C. Parenthetically it should be noted that if the alumina sample is a very viscous sol even after addition of the water, the acid should instead be added to the alumina dispersion. The diluted alumina sample and acid are mixed, stirred and transferred to a stoppered bottle and are placed in a controlled temperature bath held at 98° C. If the alumina sample is a sol or dispersion which is not stable or which is not readily prepared at a concentration such that 4.8 grams of $Al_2O_3$ can be contained in the amount of water involved in this technique, then the amounts of acid and alumina can be reduced but maintained in the ratio of 3:1 moles as above.

Ten gram samples are taken at intervals. Each is diluted to 100 grams with distilled water and quenched to 25° C. to arrest depolymerization. Each is titrated immediately with 0.5 Normal sodium hydroxide.

Instead of using 0.5 Normal sodium hydroxide, more or less concentrated sodium hydroxide solutions can be used depending upon the concentration of the alumina sample and the fraction of the sample depolymerized. The selection of a sodium hydroxide concentration for the titration follows standard analytical techniques.

One sample is taken immediately and others are taken at measured time intervals of about, say, ten or twenty minutes. If it is found that the sample is rapidly depolymerized then a special effort can be made to effect titration as soon as possible after adding the acid to the alumina and as frequently as possible thereafter. If the sample is more slowly depolymerized then the time intervals can be extended. Thus the intervals may range from a few seconds to as much as several weeks.

The results of the titration are interpreted as in the determination of the concentration of a weak acid in the presence of a stronger one. As the base is added to the system any excess of the unreacted hydrochloric acid is first neutralized with the base until the pH rises rather rapidly to about pH 3.5. The aluminum chloride, or other aluminum salt, acts as a buffer and the pH does not rise further until it has been neutralized. The titration is continued until the pH rises to about 8. The moles of sodium hydroxide used to effect neutralization between pH 3.5 and 8 is then divided by 3 to give moles of aluminum ion in the system. This type of titration is discussed in greater detail in Treadwell et al., Helvetica Chim. Acta., 15 (1932), 980.

Instead of determining the concentration of depolymerized alumina ions by titration one can instead use other standard methods for determining aluminum ion concentration in the presence of polymerized alumina. For example, colorimetric determination, polarographic determinations, or gravimetric determinations can be used. The procedure above given, however, is rapid, accurate, and convenient when the sample does not contain interfering substances like acetic acid or iron, titratable in the same pH range.

After the amount of alumina in each of the samples taken has been determined as by titration, these quantities can be plotted against time. The time required to effect depolymerization of half of the alumina can then readily be picked from the resulting graph. As has been noted briefly above, if the time intervals were not well selected in the first instance then a new set of samples should be taken over shorter periods or over longer periods as required to give a satisfactory plot.

Aluminas which are rapidly depolymerizable in acid and which have a $\theta$ value of one minute or less are especially preferred. Thus the starting material can be an alumina which is quite rapidly dissolved such as basic aluminum chloride, aluminum hydroxide, alumina gels, or colloidal solutions of alumina. In all of these alumina is present in an aqueous system in a dispersed condition. Aluminum is associated in each of them with oxygen and is probably in some degree of hydration.

It is not feasible to determine the precise degree or character of hydration of the alumina or the mode of combination of the oxygen, the acid radical and water in the system. It is, nevertheless, the fact that the aluminum present is undoubtedly combined in some manner with oxygen and upon evaporation and ignition of the solution, a residue of $Al_2O_3$ is obtained. In aqueous solutions or dispersions suitable for use according to the invention, it will accordingly be possible to dry the solution, to ignite the residue, and to determine the $Al_2O_3$ content. Thus, in referring to "alumina" in the aqueous dispersions used, it will be understood the term signifies the $Al_2O_3$ content as so determined and not that the aluminum in the dispersions is necessarily present as the specific compound $Al_2O_3$.

Therefore, in speaking of the alumina as dispersed in an aqueous system, it will be understood that this term is used to include solutions such as those of a basic aluminum chloride, colloidal dispersions, or colloidal solutions such as various aluminum hydroxide sols, or suspensions of highly hydrated alumina such as precipitated aluminum hydroxide.

As typical of materials which dissolve rapidly and which serve as a source for alumina in processes for making fibrous boehmite, there can be mentioned solutions of aluminum chloride which have been partly neutralized with a base to form a basic aluminum chloride. Similar solutions can be made as shown in Huehn and Haufe, U.S. Patent 2,196,016, April 2, 1940, by dissolving metallic aluminum in aqueous solutions of aluminum nitrate or aluminum halides under controlled conditions.

Freshly precipitated aluminum hydroxide which has been carefully washed to remove salts will also serve to form dispersions of alumina. This can be dispersed mechanically in water and a strong acid added to obtain the conditions which are preferred for use in processes of the invention.

Sols of amorphous alumina suitable for use in processes of the invention can also be prepared by the electro dialysis of solutions of aluminum nitrate, for example, to produce aqueous dispersions of alumina having the desired quantity of nitrate radicals. Sols can be used which have been prepared by the ion exchange of aluminum salts with ion exchangers.

An alumina sol to be used as a starting material can be prepared by a heating and shearing treatment as described by Bechtold and Stark, U.S. Patent 2,590,853.

Instead of the sols and basic aluminum salts described, processes of the invention can employ materials which under the conditions of treatment are converted to such starting materials. Thus there can be used such salts of aluminum as aluminum sulfate and aluminum chloride. These are considered the equivalent of alumina because they go to alumina.

In addition to the types and forms of alumina above described there can additionally be used dispersions of crystalline alumina.

Crystalline alumina can be regarded as "polymerized" alumina. By analogy with organic systems or the polymerizations of the silica system, small units of the aluminum-oxygen compounds present can be joined together to form relatively large molecules or micelles. In such alumina polymers the ultimate units are joined by chemical bonds rather than by weak physical forces.

One type of bond which is present in polymerized alumina is the aloxane-bond. Aloxane-polymerized crystalline alumina includes a variety of dehydrated aluminas which contain a multiplicity of Al—O—Al bonds. These bonds will be referred to herein as "aloxane" bonds and the polymers of such forms of alumina will be called "aloxane-polymerized alumina."

When an alumina which is made up of a plurality of smaller units whether crystalline, aloxane-polymerized, or polymerized or aggregated in some other manner is treated with an acid the polymerization process is reversed and the particles "come apart." Thus by the addition of an acid like hydrochloric the polymeric alumina can be dissolved to form aluminum ions. The determination of $\theta$ is based on this phenomenon.

As an example of an alumina which can be depolymerized rather rapidly, there can be named an alumina trihydrate known as gibbsite which is an acid soluble variety of crystalline hydrated alumina.

A suspension of alumina trihydrate of the type known commercially as Bayer hydrate and having a value of $\theta$ of 160 minutes can be used as a source of alumina. The alumina trihydrate of Wall, U.S. Patent 2,549,549, can also be used.

Aloxane-polymerized crystalline aluminas can be prepared by heating gibbsite in air for one-half to a few hours at about 400° C.

As starting materials there can be used such aloxane-polymerized crystalline aluminas as chi-alumina, kappa-alumina, delta-alumina and theta-alumina. More generally it can be said that such aloxane-polymerized crystalline aluminas can be used as those prepared by dehydrating the various hydrated aluminas such as gibbsite, bayerite, and naturally occurring boehmite. The nomenclature for various such starting materials is found in "The Dehydration of Alumina Hydrates," by De Boer, Fortuin, and Steggerda in Koninkl. Ned. Akad. Wetenshap. Proc. 57, 170–180 (1954).

The starting materials are formed into a suspension of alumina in water. If the starting material is a sol then of course it is already suspended. If it is water soluble at the pH of the reaction then it is simply dissolved in water which contains the acid to be used in the process.

If the alumina is not readily soluble in the aqueous acidic system to be used in the process, it can simply be suspended by stirring. Generally if a highly polymerized alumina is used its particles should be of such a size that they will pass through a 100 mesh screen. The suitability of the especially preferred group of aluminas as to both particle size and character can be determined by the fact that the value of $\theta$ is below 500.

The aqueous dispersions heated in processes which are modified according to the invention are acidic. As the reaction proceeds some, such as basic aluminum chloride, will become more acidic as fibrous boehmite forms.

When it is said that the solutions are acidic it is meant that there is present in the solution an acid radical titratable with sodium hydroxide. This excludes, for example, the chlorine in salts such as sodium chloride and similar acid radicals in other neutral satls which may be present in the dispersion. The acid radicals can be present, for example, in solutions of basic aluminum chloride. In such solutions, the chloride ions are titratable with alkali. Thus a sample of the solution can be titrated with a standard solution of sodium hydroxide until neutralized to a pH of 8. The titration value gives a measure of the concentration of acid radicals present in the solution and will of course not include anions of neutral salts such as those of sodium chloride.

This may be stated in another way by saying that the acid radical concentration is the amount of acid in the aqueous dispersion in excess of that stoichiometrically required to form normal salts with all cations other than aluminum-containing cations.

The acidity required for processes of the invention can be derived wholly from the sulfate ion. Or it can be derived from a mixture of a source of sulfate ions with one or more strong monobasic acids which have a dissociation constant greater than 0.1 at 25° C. Typical of such acids are hydrochloric, nitric, perchloric, iodic, hydrobromic, and trichloroacetic.

The amount of monobasic acid can be varied and can range from none of that required for complete formation of a normal salt of the aluminum in the system to say, about 100% of that amount. Too large of an amount of the monobasic acid tends to prevent the formation of fibers.

More broadly, acidity can be derived from a source of sulfate ions with one or more acids with a dissociation constant greater than $10^{-5}$. For example, acetic acid can be used.

The acidic aqueous dispersion of alumina includes a material which supplies sulfate ions. Thus there can be included in the disperson between about 0.33% and 100%, or preferably between 3.3% and 100% of that sulfate required for a complete formation of a normal salt of the aluminum in the system.

The sulfate can be added as aluminum sulfate, sulfuric acid, sodium hydrogen sulfate or potassium hydrogen sulfate in sufficient quantity to provide the desired proportion of sulfate ions.

The total of acid radicals, that is both sulfate and the radical of the strong monobasic acid, or other acid, should be at least 5% and not more than 100% of that required to form the normal aluminum salt of the alumina in the dispersion. It is however preferred that the total of acid radicals represent about 10 to 40% of that required to form the normal aluminum salt.

It is understood that the acid radical being that titratable as above described, the sulfate can be added as a neutral salt such as sodium or potassium sulfate. In the presence of a strong monobasic acid as described, the titratable acid radical will effectively include sulfate as well as the other radical. The amount will be diminished by the amount of sodium or potassium or other cations of strong bases. When it is said above that the monobasic acid may range up to 100% it is upon the basis that some sulfate will be present within the ranges recited, but the total of titratable acid radicals will still not exceed the limits above recited.

The effect of sulfate ions is to make the fibers of alumina thinner and longer than fibers made under comparable conditions without sulfate, and the amount of sulfate can be chosen to give the desired magnitude of effect.

Aqueous dispersions of alumina prepared as above described and containing sulfate ions are heated to form fibrous alumina. The temperature and the length of time is simply that required to effect this conversion.

Temperatures used can fall within the range from about 250 to an upper practical operating limit of about, say, 600° C. or even higher. Temperatures of 325° to 475° C. lead to particularly long and interesting fibers.

The exact time at any given temperature and with a particular system depends upon the temperature used. With temperatures between 400° and 500° C. heating times from three-fourth to one and three-fourth hours or even more are satisfactory with equipment designed for batch operation. At lower temperatures longer times are required.

The preferred time is in general inversely proportional to the temperature being used. For example when operating at temperatures between 400° and 450° C. a reaction time of 1 to 3 hours is preferred. On the other hand, when operating at 450° to 500° C. reaction times of from 0.1 to 1 hour are preferred.

If the process is conducted in a continuous manner, then there is little heat-up time and the heating schedule will vary somewhat. The length of time during which the reaction mixture is maintained at the operating temperature of 400° C. to 500° C. can vary from a few minutes, say, 5 to 10 minutes up to several hours, say, about 3 hours or more.

The products of the invention are a fibrous modification of alumina having the characteristic X-ray diffraction pattern of boehmite. Some additional lines are found in certain samples and these may represent other forms of alumina.

The fibrous alumina products of the invention are characterized by containing sulfate ion. The amount of sulfate varies with the amount of sulfate ion in the aqueous dispersion and with the specific process conditions. Generally the amount of sulfate ion in the product is less than 18% based on the weight of alumina ($Al_2O_3$). The amount can become less as less sulfate is present in the reaction and can go as low as, say, about 0.1%.

The fibrous products of the invention are further characterized by their high axial ratio. The presence of sulfate causes fibers to have even a higher ratio than products produced by prior practices.

The ratio of the length of the fibril to the width as observed on an electron micrograph, here called the axial ratio, preferably exceeds about 100:1.

It will be seen in the drawing and particularly in FIGURE 2 that the ultimate fibrils 1 are often associated into bundles of fibers 2. In referring to axial ratio, reference is made to the individual fibrils. The fibers or tactoids which are made up of bundles of fibrils become quite long. Both in this figure and in FIGURE 1 the fibrils are so long that they extend beyond the borders of the figures. The length can be seen in the original photomicrographs which are too large for the patent sheet.

The individual fibrils in some preferred products have at least one dimension and preferably two in the colloidal range, averaging, say, 10 to 100 millimicrons. In some products however the smallest observable dimension may run to several times this figure.

Products of the invention exhibit characteristic infrared absorption. They have the following specific absorptions: a band at 8.64 microns, two bands of approximately strong equal intensity at 3.02 and 3.23 microns, and two separate peaks at 4.75 and 5.05 microns.

Some preferred products of the invention produced at relatively high pressures and temperatures are made up of boehmite fibrils characterized by having an average minimum length of about 6.4 microns.

Other preferred products of the invention produced at moderate temperatures and pressures are the curved fibers and fibrils of alumina produced by the process of Example 5.

Throughout the conversion of alumina to fibrous alumina by heating, the aqueous dispersion is maintained under sufficient pressure to maintain a fluid density of at least 0.5 in the reaction system. The fluid density of the reaction system is a complex function of temperature, pressure, degree of filling of the reaction vessel, and ballast expansion volume. This fluid density can be estimated for any given set of operating conditions from the vapor pressure data of water published by Kennedy in Am. J. Science, 248, 540–64 (1950).

The maintenance of the fluid density at the proper value can be accomplished by various means. One method involves partially filling the reaction vessel with the amount of aqueous alumina dispersion which, on the basis of the Kennedy water vapor data, will provide the desired fluid density above a minimum of 0.5 when the closed reaction vessel is being heated to the operating temperature. Another method involves completely filling the reaction vessel with the alumina sol and then connecting the reaction vessel to a water reservoir of large capacity maintained at low temperature whereby this water reservoir absorbs the water forced out of the reaction vessel by expansion on heating to operating temperature. Another method involves completely filling the reaction vessel with the alumina sol or dispersion and then intermittently leading out of, or injecting into, the reactor sufficient water to maintain a pressure which will provide a fluid density in the system of at least 0.5.

The very thin and elongated fibers of the invention are of value as fillers, stiffening agents or tensile and abrasion reinforcing agents for plastics, film, paints, waxes, and coatings. The fibrous products are also useful as thickening agents in aqueous systems. A 2% aqueous suspension of the fibrous alumina of this invention is quite thixotropic and the fibers do not settle much over a period of 24 hours. The fibrous alumina of this invention is also useful as a mat former for flexible paper-like products and as an extender for other fibrous materials in film-or-mat-forming operations.

In order that the invention may be better understood reference should be had to the following illustrative examples in which proportions of ingredients are expressed in parts by weight unless otherwise specified.

EXAMPLE 1

A platinum cylindrical reaction vessel closed at one end is charged with 1 part of powdered Bayer alumina trihydrate and 0.71 part of aluminum sulfate octadecahydrate in 11.5 parts of water. The alumina trihydrate has a value of $\theta$ of 160 minutes. The reaction vessel is closed with a sliding platinum piston.

The charged reaction vessel is then placed in a corrosion-resistant container capable of withstanding high pressures, and the remainder of the space in the container filled with water. After being pressured initially to 3000 atmospheres, the assembly is externally heated to 500° C. for one hour with sufficient relief of pressure during the heating cycle to maintain the pressure in the range of 2950–3150 atmospheres.

After the reaction vessel is cooled and the excess pressure released, the reaction product in the platinum vessel is isolated by filtration. This product comprises mainly lath-like bundles of fibrils having dimensions of about 16 microns by 1 micron with the fibrils themselves having dimensions of 16 microns by 0.025 to 0.04 micron.

X-ray examination shows the product to be a mixture of boehmite (alumina monohydrate) and an alumina product whose X-ray pattern has a strong diffraction line at 3.00 A.

Fibers so produced contain 14.13% of sulfate by weight and the axial ratio is about 400:1.

Water can be removed from the product by azeotropic distillation with butyl alcohol and the fibers can then be dried and used for reinforcing plastics. Thus 20% can be incorporated into polyethylene to give increased strength and rigidity.

EXAMPLE 2

A mixture of 10 parts of a water-clear, hydrated alumina sol peptized with 2% of the theoretical amount of nitric acid and containing 5% by weight $Al_2O_3$ is diluted with 80 parts of water containing 0.356 part of aluminum sulfate octadecahydrate.

This partially precipitated material is placed in a flexible platinum reaction vessel precollapsed to 70% of its expanded volume and the vessel is then sealed. The platinum reactor is placed in a corrosion-resistant pressure vessel otherwise filled with water and connected with an expansion chamber likewise filled with water. The system is sealed and the corrosion-resistant vessel is externally heated to 400° C. for three hours under autogenous pressure to maintain the internal pressure in the range of 1050 to 1100 atmospheres.

The reaction product, after cooling and removal from the platinum reaction vessel, is a white suspension of fibrous alumina monohydrate. X-ray examination of a filtered portion of the product shows the characteristic boehmite diffraction pattern. Under the electron microscope the product is shown to be composed principally of fibers 25–50 microns long and less than 0.25 micron wide. The individual fibrils are about 0.015 to 0.02 micron in their two smaller dimensions. A product of this example appears as in FIGURE 2 in an electron micrograph. In the figure there is seen at 1 the ultimate fibril and at 2 there is seen a bundle of fibers.

The product contains sulfate in the amount of 1.54% by weight. The axial ratio of the fibrils is above 1000:1. A self-cohesive, flexible mat is formed by filtration of the product. The flexibility of this mat is due to the length of the alumina fibrils.

EXAMPLE 3

Forty parts of a 5% alumina sol peptized with an amount of nitric acid corresponding to 2% of the theoretical is mixed with 1.42 parts of aluminum sulfate octadecahydrate.

The partially recipitated mixture which results is used to fill a platinum reaction vessel fitted with a pressure relief orifice. The charged reaction vessel is then placed in a corrosion-resistant pressure vessel otherwise filled with water. This is heated externally to 475° C. for one hour under autogenous pressure after initial pressuring to 1000 atmospheres. Sufficient pressure is relieved during the heating cycle to maintain the reaction pressure at 1800–2200 atmospheres.

After the reaction vessel is cooled and opened, the product is removed. This is a white suspension which examination under the electron microscope shows to be fibrils up to 25–50 microns in length with the major portion greater than 12 microns long and approximately 0.12 micron thick. The product appears about as in FIGURE 1 of the drawing. The axial ratio of the fibrils is above 100:1.

X-ray examination of the filtered product shows a strong boehmite pattern plus a moderately strong pattern of an unidentified phase. Chemical analysis of the water-washed fibrils of this example shows 3.53% sulfate ion and 84.29% $Al_2O_3$. The theoretical $Al_2O_3$ content of boehmite is 84.98%. The ratio of $Al_2O_3$ to sulfate is 22.5:1.

Filtration of a dilute aqueous slurry of the fibrils of Example 3 forms self-supporting, flexible mats. Heat treatment of these mats at 400° C. for two hours in an oven causes no apparent change in properties. X-ray examination of the heat-treated alumina paper-like mats shows that the X-ray diffraction pattern is essentially unchanged.

The aqueous product can be used together with 40% of glass fibers to form a heat resistant paper.

EXAMPLE 4

As a starting material there is used 21.2 parts by weight of a hydrated alumina gel having a value of $\theta$ of less than one minute. This product contains 10.5% $Al_2O_3$ and the amount corresponds to 44 parts of aluminum on a mol basis. To this is added 1.335 parts of aluminum sulfate octadecahydrate, $Al_2(SO_4)_3(18H_2O)$. This corresponds to 4 parts of aluminum ion and 6.02 of sulfate ion on a mol basis. There is then added 2.5 parts by weight of 1.02 normal nitric acid. This amount of nitric acid is equivalent to 2.6 parts of nitrate ion on a mol basis. The ratio of aluminum to acid radicals is 5.54:1 and the sulfate to nitrate ratio is 2.26:1. The percent $Al_2O_3$ is 0.65.

The mixture is diluted to a total weight of 300 parts by adding distilled water and dispersed by violent agitation. The pH of the resulting solution is 4.38.

71 parts of this solution are placed in a platinum tube sealed at both ends and autoclaved for 8 hours at 360° C. Th product when examined by X-ray diffraction gives a sharp, crystalline pattern of boehmite plus a series of weak lines which are similar to those of alunite. The product contains 8.30% by weight of sulfate. On examination at high magnification in electron micrographs, the product contains very long and very thin fibers. The product is shown in the main portion of FIGURE 1.

The product upon drying forms a coherent paper-like mat similar in appearance to asbestos.

A product prepared as in this example but without the sulfate, when examined in electron micrographs is found to be several times as thick as the fibrils of the example. Fibrils produced without sulfate present are illustrated in the inset in FIGURE 1. The axial ratio with sulfate present is over 100:1 while without sulfate it is about 10:1.

The X-ray diffraction patterns obtained on the products of Examples 1, 2 3, and 4 are listed below together with the X-ray diffraction pattern of boehmite. In this table "d" is the spacing of the various reflections of filtered $CuK_\alpha$ radiation, in A. units, and I is an arbitrary, visually estimated indication of the intensity of the lines in the pattern, the symbols having the following meanings: S, strong; $M_1$–$M_4$, medium, $M_4$ being weakest of the M ratings; F, faint; and V, very faint.

X-Ray Powder Diffraction Lines

| Example 1 | | Example 2 | | Example 3 | | Example 4 | | Boehmite | |
|---|---|---|---|---|---|---|---|---|---|
| d | I | d | I | d | I | d | I | d | I |
| 6.80 | F | | | | | 6.75 | $M_3$ | | |
| 6.20 | S | 6.10 | S | 6.14 | S | 6.103 | S | 6.20 | S |
| 5.7 | $M_4$ | | | | | 4.90 | $M_2$ | | |
| 4.9 | $M_2$ | | | 4.98 | $M_4$ | | | | |
| 4.6 | F | | | | | | | | |
| 4.4 | F | | | | | | | | |
| 3.5 | $M_3$ | | | 3.52 | F | | | | |
| 3.3 | F | | | | | | | | |
| 3.25 | F | | | | | | | | |
| 3.17 | S | 3.16 | $M_3$ | 3.16 | $M_1$ | 3.17 | $M_1$ | 3.17 | S |
| 3.10 | F | | | | | | | | |
| 3.05 | F | | | | | | | | |
| 3.00 | S | | | 2.985 | $M_3$ | 2.97 | $M_3$ | | |
| 2.85 | F | | | | | 2.79 | $M_4$ | | |
| 2.80 | V | | | 2.786 | V | | | | |
| 2.56 | F | | | | | | | | |
| 2.50 | V | | | | | | | | |
| 2.39 | $M_4$ | 2.41 | V | | | 2.35 | $M_3$ | | |
| 2.35 | S | 2.345 | F | 2.347 | $M_1$ | | | 2.32 | S |
| 2.27 | $M_3$ | | | 2.28 | F | 2.225 | $M_4$ | | |
| 2.22 | $M_4$ | | | | | | | | |
| 2.12 | $M_4$ | | | | | 2.03 | $M_4$ | | |
| 2.09 | $M_2$ | | | | | | | | |
| 1.98 | $M_3$ | 1.975 | V | 1.98 | $M_4$ | 1.98 | F | 1.98 | $M_1$ |
| 1.91 | $M_2$ | | | 1.916 | $M_4$ | 1.90 | $M_4$ | | |
| 1.85 | $M_1$ | 1.857 | F | 1.85 1.864 | } $M_2$ | 1.86 | $M_2$ | 1.86 | S |
| 1.77 | $M_3$ | 1.766 | V | 1.77 | $M_4$ | 1.85 | $M_3$ | 1.77 | $M_1$ |
| | | | | | | 1.77 | $M_4$ | | |
| | | | | | | 1.75 | F | | |
| 1.75 | $M_3$ | | | | | | | | |
| 1.66 | $M_3$ | 1.660 | V | 1.66 | $M_3$ | 1.665 | $M_4$ | 1.66 | S |
| 1.61 | $M_3$ | | | | | | | | |
| 1.57 | $M_4$ | | | | | | | | |
| 1.55 | $M_4$ | | | | | | | | |
| 1.53 | $M_3$ | 1.525 | F | 1.53 | $M_4$ | 1.53 | $M_2$ | 1.53 | $M_1$ |
| 1.51 | F | | | | | | | | |
| 1.49 | $M_3$ | | | 1.49 | F | 1.465 | F | | |
| 1.455 | $M_2$ | | | 1.45 | $M_3$ | 1.45 | $M_4$ | 1.46 | S |
| 1.439 | $M_3$ | | | 1.437 | $M_3$ | 1.435 | F | 1.43 | $M_1$ |
| 1.41 | $M_4$ | | | | | | | | |
| 1.40 | F | | | 1.395 | F | 1.38 | $M_4$ | | |
| 1.385 | $M_4$ | 1.38 | V | 1.384 | $M_4$ | | | 1.38 | S |
| 1.38 | $M_4$ | | | | | | | | |
| 1.325 | F | | | | | | | | |
| 1.315 | $M_1$ | 1.310 | V | 1.310 | $M_2$ | 1.31 | $M_4$ | 1.31 | S |
| 1.295 | $M_4$ | | | | | | | | |
| 1.24 | F | | | | | 1.21 | $M_4$ | 1.22 | $M_3$ |
| 1.21 | F | | | 1.210 | V | | | 1.21 | $M_2$ |
| 1.195 | F | | | | | | | | |
| 1.18 | F | | | 1.18 | F | 1.18 | $M_4$ | 1.18 | $M_1$ |
| 1.17 | V | | | | | | | | |
| 1.165 | $M_4$ | | | 1.162 | F | 1.16 | $M_3$ | 1.16 | $M_1$ |
| 1.148 | F | | | | | | | | |
| 1.135 | $M_3$ | | | 1.133 | $M_4$ | | | 1.13 | S |
| 1.115 | F | | | | | | | | |
| 1.105 | V | | | | | | | | |

EXAMPLE 5

Twenty-five parts of a 5% alumina sol peptized with an amount of nitric acid corresponding to 2% of the theoretical is mixed with 0.89 part of aluminum sulfate octadecahydrate. This corresponds to a ratio of aluminum to sulfate of 9.2. This mixture is placed in a flexible platinum vessel precollapsed to 70% of its expanded volume and the vessel is then sealed. The platinum container is placed in a corrosion-resistant vessel otherwise filled with water and connected with an expansion chamber likewise filled with water, of the type used in Example 2. The system is sealed and the corrosion-resistant vessel is externally heated to 400° C. for one hour under a pressure of 1000 atmospheres.

The reaction product, after cooling and removal from the reaction vessel, is a white suspension of alumina monohydrate in the form of long fibers and fibrils. X-ray examination of a filtered portion of the product shows it to be boehmite with a trace of an unidentified phase. Under the electron microscope, the product is shown to be principally fibers 5 to 30 microns long and less than 1 micron wide. The individual fibrils are less than 0.1 micron in diameter, and have axial ratios greater than 100:1. The product of this example appears in an electron micrograph very much like the product of FIGURE 2. In the micrograph of this produce there are seen several bundles of fibers, clusters of intertwined fibrils, and individual fibrils, many of which are curved.

EXAMPLE 6

The starting material is a commercial alumina gel, Reheis F–1000 U.S.P. Alumina Gel, having the following composition:

53% $Al_2O_3$
0.2% $Na^+$
0.16% $SO_4^=$
2.3% $CO_3^=$

A stirred mixture of 4.7 parts by weights of the alumina gel (2.50 g. $Al_2O_3$), 250 parts distilled water and 0.27 parts glacial acetic acid was heated on a steam bath to 98° C. After about 10 minutes the partially peptized gel was cooled to 25° C. and 225 parts water and 25 parts of 0.1086 M $Al_2(SO_4)_3$ were added. The cited conditions provided a mixture containing Total Al as $Al_2O_3$=0.565%, 0.0272 mole (0.163 g. equiv.)
HOAc=0.054%, 0.045 g. equiv. (~3% of theory to form normal salt).
$SO_4$=0.156%, 0.00815 g. mole (.0163 g. equiv.)
Al/$SO_4$= g. equivalents ratio=10.
Total anion content is 12.8% of that necessary to form a normal salt.

Twenty-eight parts of the above gel mixture was introduced into a platinum tube which had been precollapsed to 70% of its expanded capacity. The tube was sealed and introduced into a superpressure autoclave where the following steps were carried out in order:

(1) Evacuated the autoclave.
(2) Injected cold water to pressure of 75 atmospheres.
(3) Heated over period of one hour to 400° C. with water injector tied in as a ballast. Pressure thus obtained was 1000–1200 atmospheres.
(4) Maintained on temperature one hour.
(5) Allowed to cool to room temperature overnight.

The flocculent product was filtered and washed. Electron micrographs of the suspension showed fibrous alumina having an axial ratio over 100:1. The sulfate content of the fibers is 1.79 percent. The fibers have the characteristic X-ray diffraction pattern of boehmite.

This application is a continuation-in-part of my copending application Serial No. 519,369, filed July 1, 1955, now abandoned.

I claim:

1. In a process for making fibrous alumina having the characteristic X-ray diffraction pattern of boehmite, the step comprising heating an aqueous acidic dispersion of alumina one-half of a sample of which can be depolymerized in excess acid at a temperature of 98° C. in a time, theta, of less than 500 minutes, the dispersion containing 0.33 to 100% of the sulfate required to form the normal salt with the aluminum present, heating being conducted at a temperature above 250° C. and at a pressure sufficient to maintain a fluid density of at least 0.5 until substantially all of the alumina is converted to the form of fibers, at least one dimension of which is in the colloidal range and which have an axial ratio of at least 100:1.

2. In a process for making fibrous alumina having the characteristic X-ray diffraction pattern of boehmite, the step comprising heating an aqueous acidic dispersion of alumina one-half of a sample of which can be depolymerized in excess acid at a temperature of 98° C. in a time, θ, of less than 500 minutes and which contains up to 100% of a strong monobasic acid which has a dissociation constant greater than 0.1 at 25° C. required to form a normal salt with the aluminum of the dispersion, from 0.33 to 100% of the sulfate required to form a normal salt with the aluminum of the dispersion, and the total of acid radicals being from 5 to 100% of that required to form a normal salt with the aluminum of the dispersion, the heating being conducted at a temperature between 250° C. and 600° C. and at a pressure sufficient to maintain a fluid density of at least 0.5.

3. In a process for making fibrous alumina having the characteristic X-ray diffraction pattern of boehmite, the step comprising heating an aqueous acidic dispersion of alumina one-half of a sample of which can be depolymerized in excess acid at a temperature of 98° C. in a time, $\theta$, of less than 500 minutes and which contains up to 40% of a strong monobasic acid which has a dissociation constant greater than 0.1 at 25° C. required to form a normal salt with the aluminum of the dispersion, from 3.3 to 100% of the sulfate required to form a normal salt with the aluminum of the dispersion, and the total of acid radicals being from 10 to 40% of that required to form a normal salt with the aluminum of the dispersion, the heating being conducted at a temperature between 325° C. and 475° C. and at a pressure sufficient to maintain a fluid density of at least 0.5.

References Cited in the file of this patent

UNITED STATES PATENTS

| 1,953,201 | Tosterud | Apr. 3, 1934 |
| 2,915,475 | Bugosh | Dec. 1, 1959 |

FOREIGN PATENTS

| 165,052 | Great Britain | Dec. 28, 1921 |

OTHER REFERENCES

Dana: A Textbook of Mineralogy, 1932, Wiley, N.Y., pp. 502–503.

Encyclopedia of Chemical Technology, vol. 1, p. 642 (1947), Interscience, N.Y.